United States Patent [19]
Hanson

[11] Patent Number: 5,226,353
[45] Date of Patent: Jul. 13, 1993

[54] MACHINE FOR FORMING CHOCOLATE SHAVING SPIRALS

[75] Inventor: Douglas R. Hanson, Anoka, Minn.

[73] Assignee: Bake Star, Inc., Anoka, Minn.

[21] Appl. No.: 931,192

[22] Filed: Aug. 17, 1992

Related U.S. Application Data

[63] Continuation-in-part of Ser. No. 678,079, Apr. 4, 1991, abandoned.

[51] Int. Cl.⁵ .................... A23G 1/00; A23G 1/20; B23D 3/04
[52] U.S. Cl. ........................... 99/483; 83/356; 83/932; 99/453; 99/537; 99/538; 409/317; 409/328; 409/331
[58] Field of Search ............... 99/483, 452, 453, 537, 99/538, 567; 426/500; 83/356, 932; 409/298, 303, 317, 324, 328, 330, 331, 334

[56] References Cited

U.S. PATENT DOCUMENTS

| | | | |
|---|---|---|---|
| 1,615,185 | 1/1927 | Zimmerman | 409/330 |
| 1,637,969 | 8/1927 | Sosa | 409/330 |
| 1,965,015 | 7/1934 | Walker | 409/328 |
| 2,352,443 | 6/1944 | Mautsch | 409/334 |
| 3,756,141 | 9/1973 | Rose | 99/483 |
| 3,868,469 | 2/1975 | Chalin | 99/483 |
| 4,706,558 | 11/1987 | Snyder, Jr. | 99/453 |
| 4,961,949 | 10/1990 | Barnes et al. | 83/932 |
| 4,979,418 | 12/1990 | Covert et al. | 99/538 |
| 5,010,796 | 4/1991 | Mendenhall | 99/538 |
| 5,097,735 | 3/1992 | Mendenhall | 99/538 |

*Primary Examiner*—Timothy F. Simone
*Attorney, Agent, or Firm*—Kinney & Lange

[57] ABSTRACT

A machine for automatically shaving a large bar of chocolate for forming a thin chocolate shaving that curls into a spiral, for use for decorative purposes. The machine has cutters that will cut an end of a chocolate bar in three separate spirals, on each stroke of the cutter. The chocolate bar is moved a desired distance for new cuts. The knives are partly curved in cross section and have cutting edges that are angled to insure a smooth separation of a thin shaving to form the curl around the curvature of the individual knife. The chocolate temperature is important in cutting, and generally is maintained in the range of 88 to 90 degrees Fahrenheit. The machine itself can be placed in a suitable environment or chamber to maintain that temperature.

24 Claims, 12 Drawing Sheets

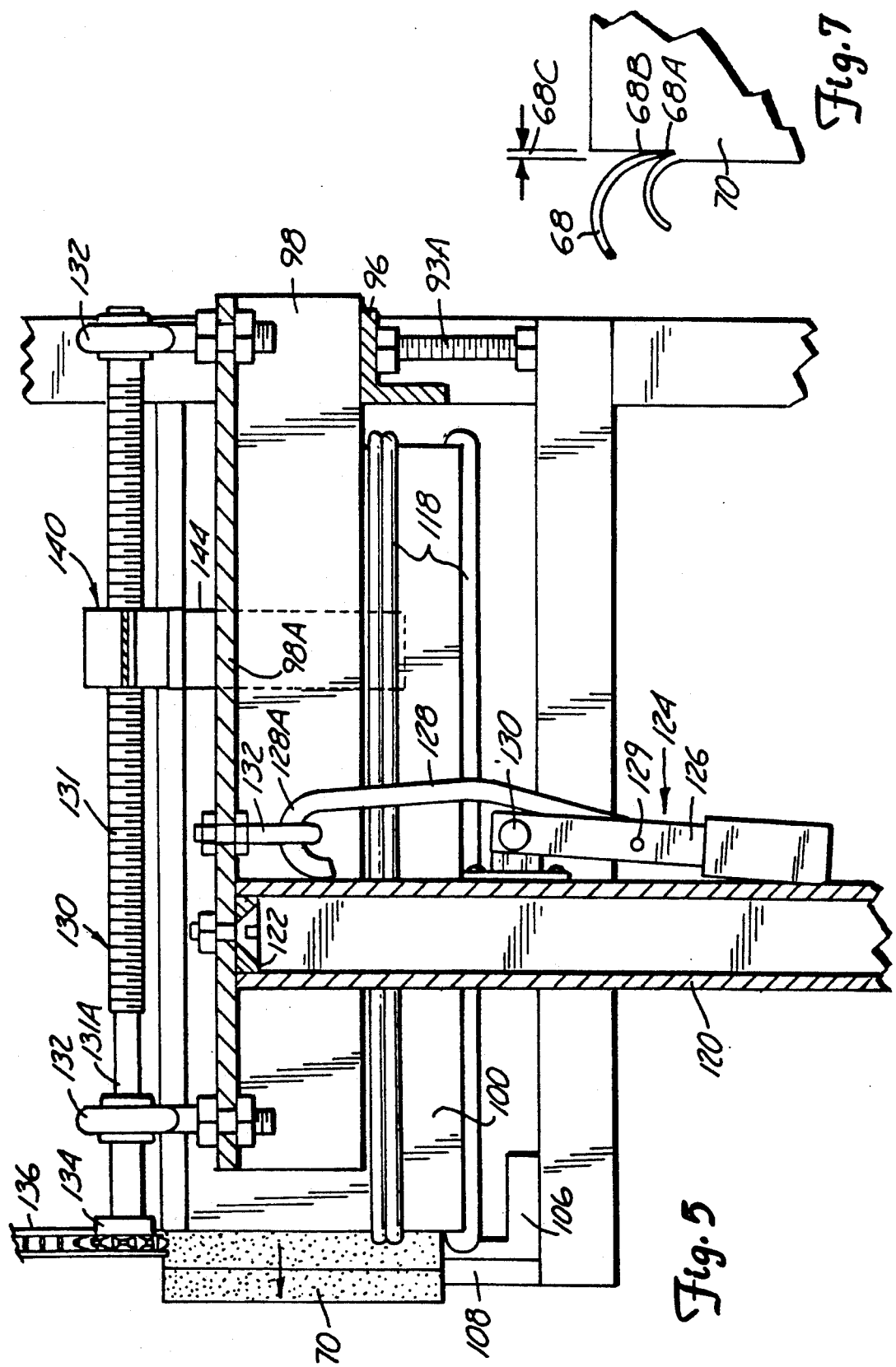

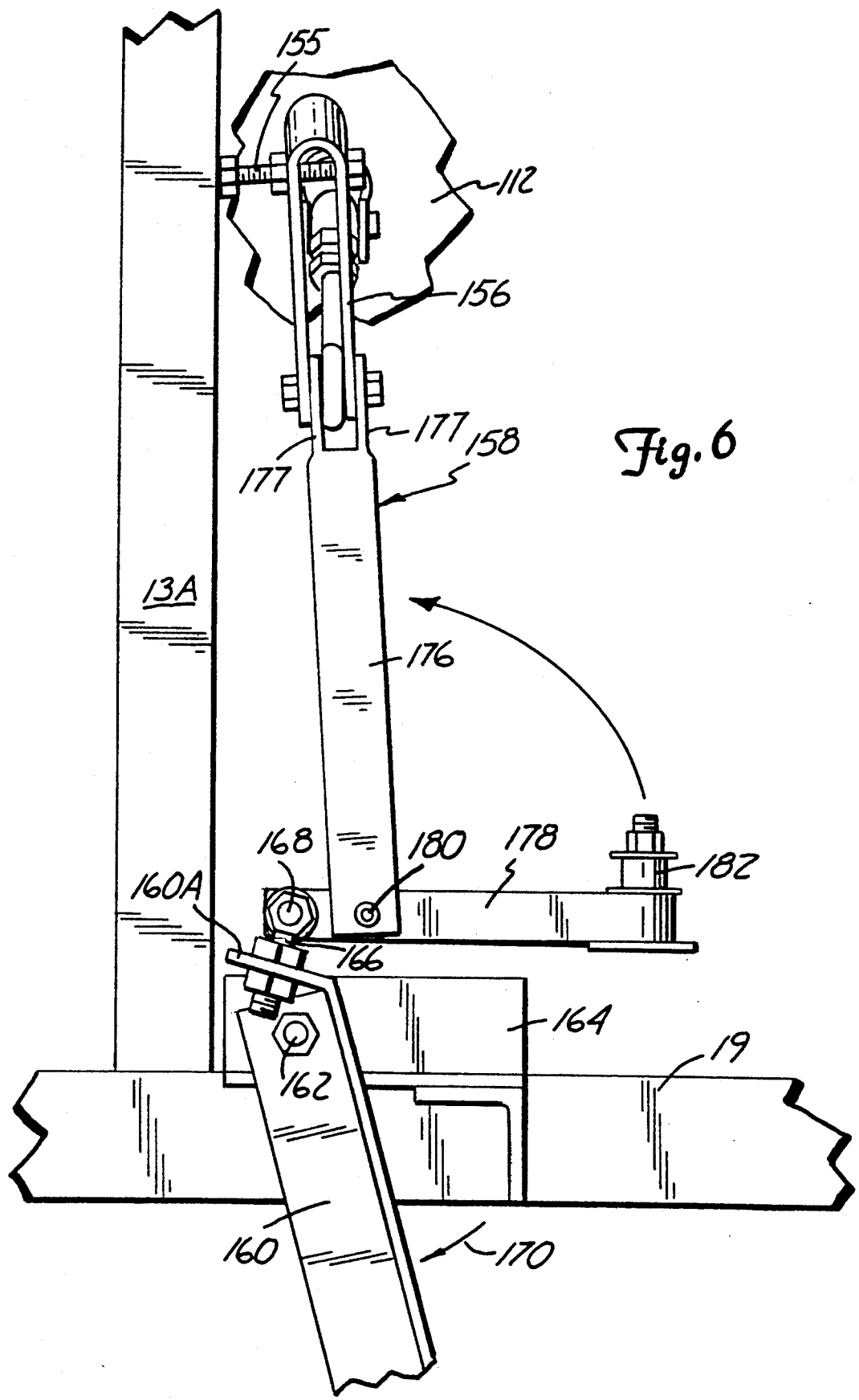

1

MACHINE FOR FORMING CHOCOLATE SHAVING SPIRALS

CROSS REFERENCE TO RELATED APPLICATION

This application is a continuation-in-part of application Ser. No. 07/678,079, filed Apr. 4, 1991, now abandoned.

BACKGROUND OF THE INVENTION

The present invention relates to a machine which will shave off an end of a standard industry bar of chocolate into thin shavings that are curled, and which curls have sufficient structural strength to be used for topping on pies, cakes, for and other decorative items utilizing chocolate curls.

At the present time, chocolate bar shavings are manually made, by operators utilizing various types of knives that shave off curls from chocolate bars. This of course, is quite slow and time consuming, and does not provide for a precisely repeatable shaving thickness and curl. The use of chocolate shavings and various chocolate confectionery items is desirable because of taste and appearance, and thus a way of making the shavings on a uniform, automatic basis is desirable.

SUMMARY OF THE INVENTION

The present invention relates to a machine for simultaneously cutting precise size and shape shavings off an end of a confectionery or candy type bar, such as a standard chocolate bar. The shavings curl as they are sliced off and for use in decorations of confectionery items. The machine supports a chocolate bar in the proper position, and has a gang of three knives that are positioned to shave off material from one end of the chocolate bar. The two corners are shaved at a chamfer or angle, and the center section surface generally perpendicular to the longitudinal bisecting plane of the bar is shaved as well. The knives are operated in a repeatable path, and between each cutting stroke, the knives retract from the chocolate bar slightly and the chocolate bar will be advanced to its cutting position. The chocolate bar is held in a support which relieves the holding pressure during the return stroke of the knives while the chocolate bar is being advanced. The parts which come in contact with the chocolate can be removed for reloading and cleaning. The knives are arranged at angles to insure smooth cutting during one stroke. The machine is relatively compact, and maintains the shavings from a chocolate bar at uniform thickness and a substantially uniform curl under controlled conditions.

BRIEF DESCRIPTION OF THE DRAWINGS

FIG. 5 is a view taken as on line 5—5 in FIG. 4 illustrating a linkage for holding a chocolate bar support in position;

FIG. 6 is a sectional view taken as on line 6—6 in FIG. 4;

FIG. 7 is an enlarged schematic representational cross sectional view of a cutting knife making a shaving on a standard chocolate bar;

DETAILED DESCRIPTION OF INVENTION

Figure 1:
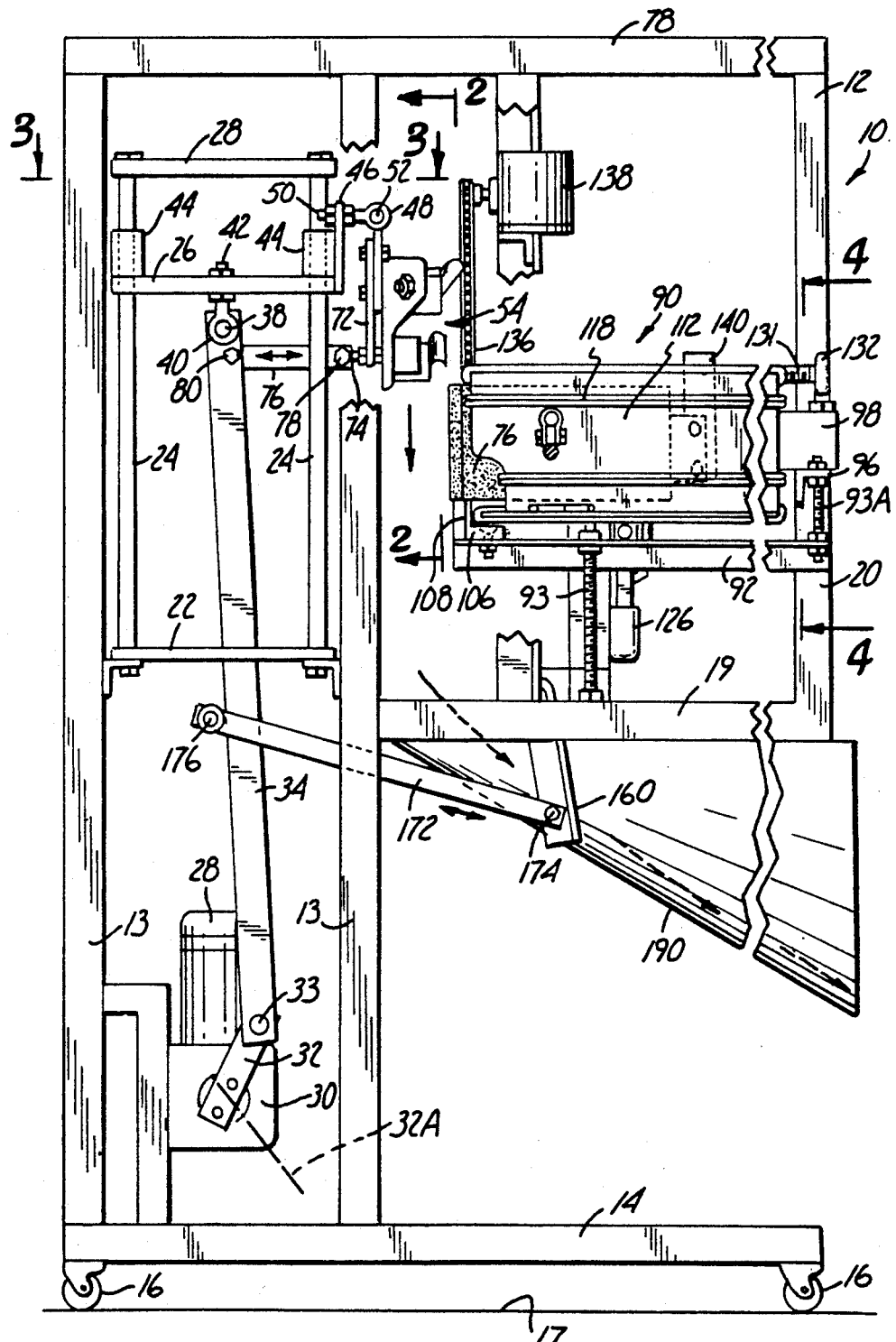
FIG. 1 is a side elevational view of a machine for forming chocolate shaving spirals made according to the present invention, with parts broken for clarity.

A machine for forming shaving spirals from a confectionery bar, such as a chocolate bar is indicated generally at 10 and includes a frame assembly 12 that has upright frame members 13 supported on a base frame 14 that can have suitable cross members. The frame 14 is mounted on casters or rollers 16 for movement over a floor surface 17. The upright frame members 13, 13 are spaced laterally apart and support top members 18, and intermediate members 19 that are also supported by a pair of upright members 20 at a front side of the machine.

The upright frame members 13 support a support plate 22 that has guide rods or columns 24 supported thereon. The guide rods 24 in turn support a slide plate 26. A cap plate 28 ties the rods 24 together at upper ends of the rods. The main machine drive for the cutting and shaving action is connected from a motor 28 that drives a gear-box 30 which has an output shaft that drives a crank arm 32. The crank arm 32 in turn is attached to a long connecting rod or link 34 that extends upwardly through the plate or support 22 through a provided slot 36 (FIG. 3) and which is connected with a pin 38 to a spherical bearing standard rod end 40. The rod end 40 has a threaded shank 42 that is locked into position on the slide plate 26, with suitable lock nuts. Slide plate 26 has 4 hubs or bearings 44 thereon that are slidably mounted over the upright guide rods 24, and as the motor 28 is powered to turn the crank arm 32, the connecting rod or link 34 will move the slide plate 26 up and down along the rods 24 through a stroke length. The link 34 is connected to the crank arm 32 through a suitable drive pin 33.

The slide plate 26 also carries an upright support plate 46. The support plate 46 in turn, has a pair of spherical bearing rod ends 48 secured thereto by lock nuts holding the threaded shank 50 of the rod ends in position. The spherical bearings 48 in turn rotatably mount a mounting shaft 52 that is part of a chocolate bar shaver knife assembly 54 FIG. 2.

Figure 2A:
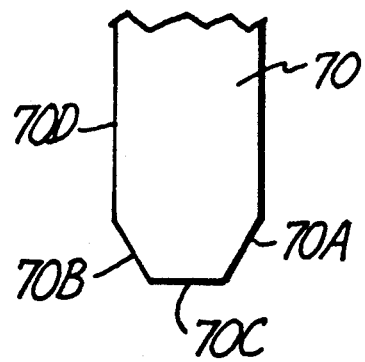
FIG. 2A is a fragmentary view of cut confectionery bar.

The shaver knife assembly 54 is made to have two cutting stations, namely a first cutting or shaver station 56 and a second cutting or shaver station 57 so that two chocolate bars can be shaved simultaneously in side by side arrangement. The knife assembly is mounted to the pivot shaft 52 with a mounting plate 55. Two individual knife plates 60 and 62 are mounted on mounting plate 55. The knife plates 60 and 62 are identical assemblies, except one is a mirror image of the other insofar as the knives are concerned. The knife plates 60 and 62 are fastened to the mounting plate 55 in a suitable manner with cap screws and each of the knife plates mounts a separate set of shaving knives. Each of the set of knives includes a first edge cutting knife 64, a second edge cutting knife 66, and a third cutting knife 68. The knives 64 and 66 are for cutting shavings and curls from the chamfer edges 70A and 70B of a standard chocolate bar 70 shown in FIG. 2A. The knives 68 are used for cutting a shaving from the center portion 70C of the end edge surface, which is perpendicular to the plane 70D of the bar 70.

The standard chocolate bars are 1⅜ inches thick, 10 inches wide and eighteen inches long. These commercial size bars are split longitudinally to make two bars that are 5 inches wide and eighteen inches long, with the standard thickness of 1⅜ inches. The 5 inch width dimension is placed to be parallel to the stroke of the knife assemblies so that the cut or length makes a spiral, after curling, of approximately 3½ inches long. The shavings take the shape of a long lazy spiral that has a curl in the range of ¼ to ⅝ inch diameter in the curling section.

The knife assemblies 56 and 57 are then moved as a unit when pivoted about the shaft 52. This movement is controlled by an actuator arm 72 fastened to the mounting plate 55. A rod end 74 is mounted at the lower end of the arm 72. The rod end 74 is a spherical bearing rod end of conventional design that is fixed to the arm 72. A connecting strap 76 is pivotally mounted to the rod end 74 with a suitable pin or bolt 78. The strap 76 in turn is pivotally mounted to the long connecting link 34 with a pivot bolt 80 adjacent to the upper end of link 34. It can be seen that with the very high ratio between the overall length connecting rod 34 and the length of arm between the pin 80 and the pin 38 the in and out movement of the shaving knife assembly about the shaft 52 will be small during the movement of the crank arm 32 from about its solid line position in FIG. 1 to a position indicated by the dotted line 32A in FIG. 1. This rotational movement from the solid line position of the arm 32 in FIG. 1 to the dotted line position 32A is essentially the cutting or shaving stroke. When the crank arm 32 moves past the dotted line position 32A there will be very little further downward movement of the link 34 and the shaving knife assembly, but the shaving knife assembly will be pulled away from the chocolate bar 70 at the lower end of the stroke to provide clearance when the crank arm continues to move, then the drive slides the plate 26 and the shaving knife assembly 54 upwardly.

Figure 2:
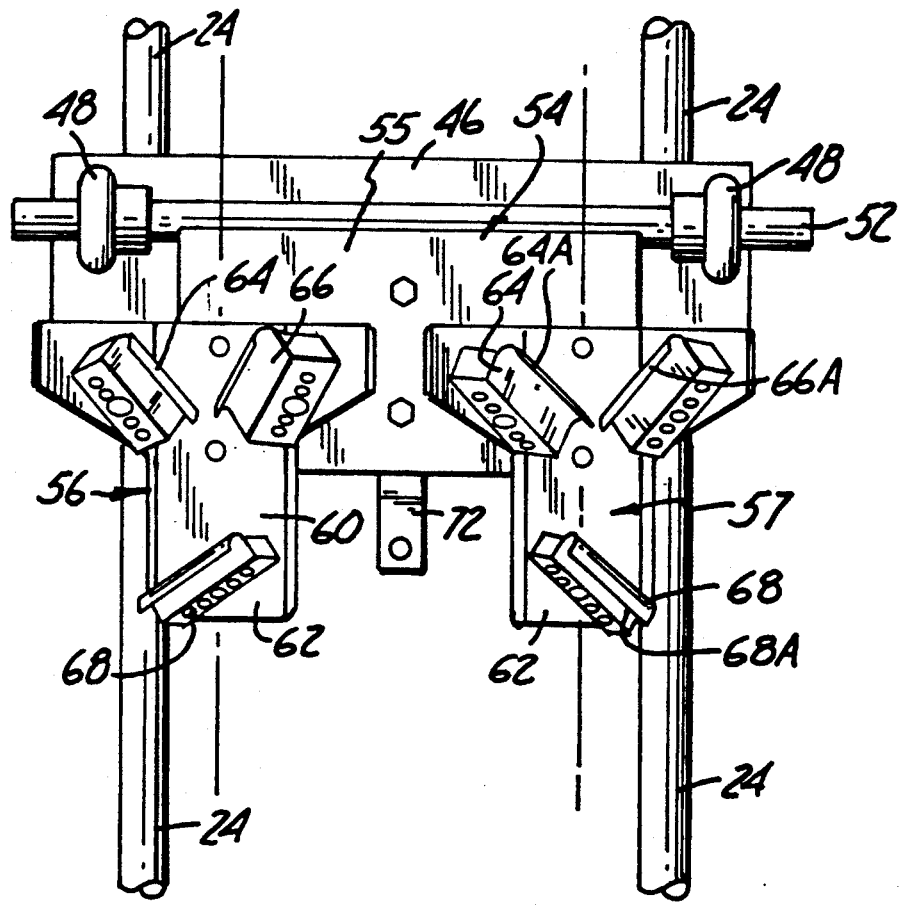
FIG. 2 is a fragmentary sectional view taken as on line 2—2 in FIG. 1.
Figure 3:
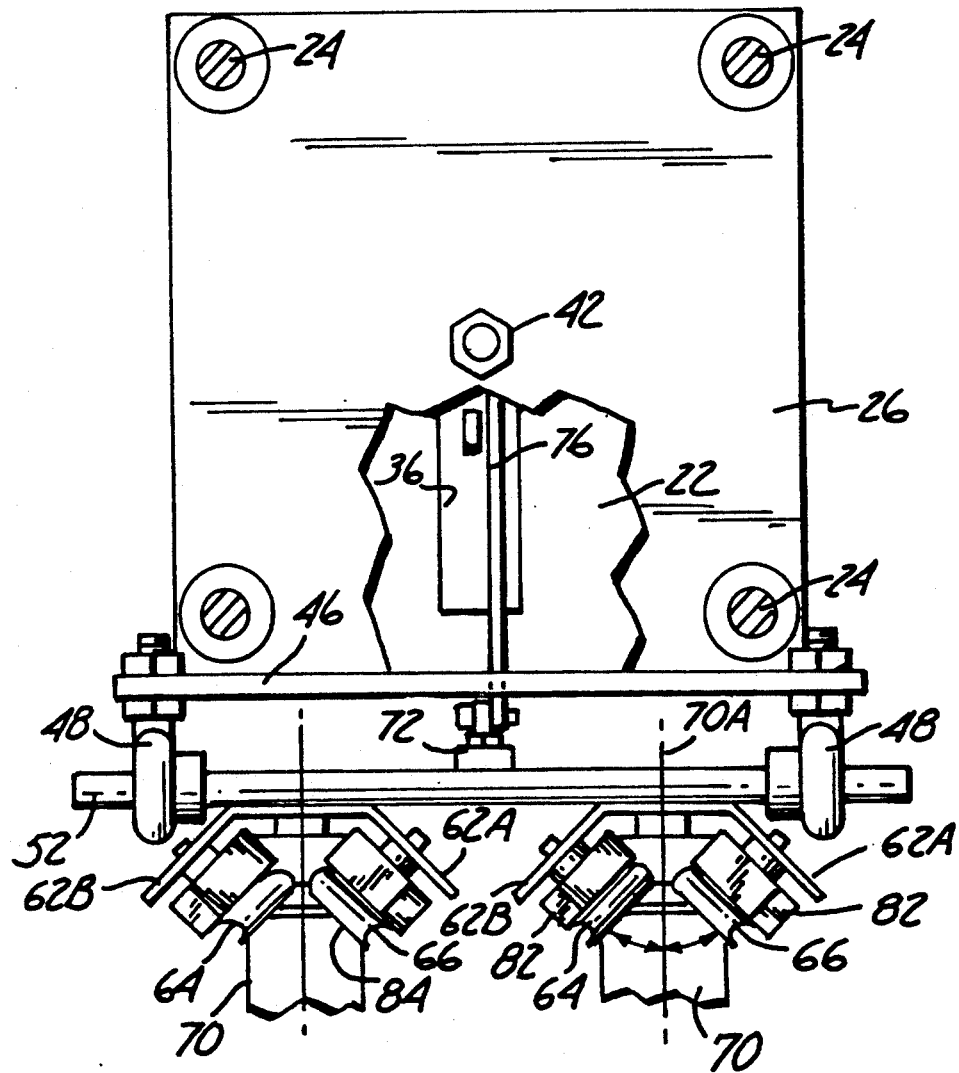
FIG. 3 is a fragmentary sectional view taken as on line 3—3 in FIG. 1.

It can be seen in FIGS. 2 and 3 that the knives 64, 66 and 68 are mounted on mounting blocks 82, that are suitably supported relative to the plate 62. The plate 62 has wing members 62A and 62B that are used for supporting the knives 64 and 66, so that the appropriate chamfer or bevel angles on the edge of the chocolate bar 70 are maintained. The blocks 82 can be spaced from these wings with suitable spacers if desired, and held in place with pins or bolts, or they can be welded in place if precisely made. The respective block 82 for the lower knife 68 is mounted onto the center portions of each of the plates 62 and positioned perpendicular to a longitudinal bisecting plane of the associated chocolate bar indicated by the lines 70A in FIG. 3 and also in FIG. 4.

Each of the knives is a curved, elongated blade that has a continuous wall defining a curve, as can be seen in FIG. 7 for example, where a typical knife 68 is shown. The blades or knives have flat portions that mount onto the mounting blocks 82, and each of the knives has a sharpened edge 64A, 66A and 68A. The sharpened edges are made so that there is a slight negative rake relative to the surface being cut on the chocolate bar. The knife edges are positioned at desired relationships relative to the plane 70 and also at an angle so that when the cutting stroke is made, the slice for shaving starts engagement with the chocolate bar at an angle relative to a plane perpendicular to the bisecting plane 70A of the respective chocolate bar.

In FIG. 3, it can be seen that the cutting edges 64A and 66A are positioned at angles of approximately 45 degrees relative to the plane 70 of approximately 45 degrees, so that they cut off the outer edge corner portions of the chocolate bar, and form a cut or shaved surface 84 that is a chamfer surface on the cutter bar (see FIG. 3). The edges 64A and 66A also are at an angle other than perpendicular to the plane 70A when viewed in FIG. 2 for example. The plane 70A is parallel to the direction of sliding of the knives, that plane 70 is parallel to the support rods 24 and the angles of the edges 64A and 66A are in the range of 45 degrees so that the chocolate bar 70 will be sliced at an angle relative to the direction of motion of the knives. The knife edges 68A are positioned so that they are on a line that is perpendicular to the planes 70A, as shown in FIG. 3, and also at an angle other than perpendicular to the plane 70A when considered in relation to the direction of travel of the knives, as shown in FIG. 2.

The curvature or rounding of the knives inner surface is such that it helps to form a curl to the shaving coming off the chocolate bar as shown in FIG. 7. Additionally, the sharpened edge 68A shown in FIG. 7 (the other edges are sharpened the same way) is made with a ground surface 68B that has a slight negative rake relative to the plane of movement of the knives of approximately 1 degree. This negative rake is indicated at 68C in FIG. 7. This means that the heel of the surface 68B will not rub against the surface of the chocolate bar 70.

A pair of chocolate bars 70 are mounted in a bar feeding assembly 90, as shown in FIG. 1, and they are slightly below the shaving knife assembly 54 when it is in the upper position and the feeding assembly 90 is made to provide for an in-feed of the chocolate bars toward the knives at a desired rate. The chocolate bar feeding assembly 90 is removably supported on a frame work that includes members 92 supported from a cross member 94 that in turn is supported on members 19, and these members 92 are angle iron members supported from the cross members 94 on threaded rods 93 that have lock nuts that are adjusted to provide support at a desired level. Additionally, threaded rods 93A are used for supporting a cross support angle iron 96.

Figure 4:
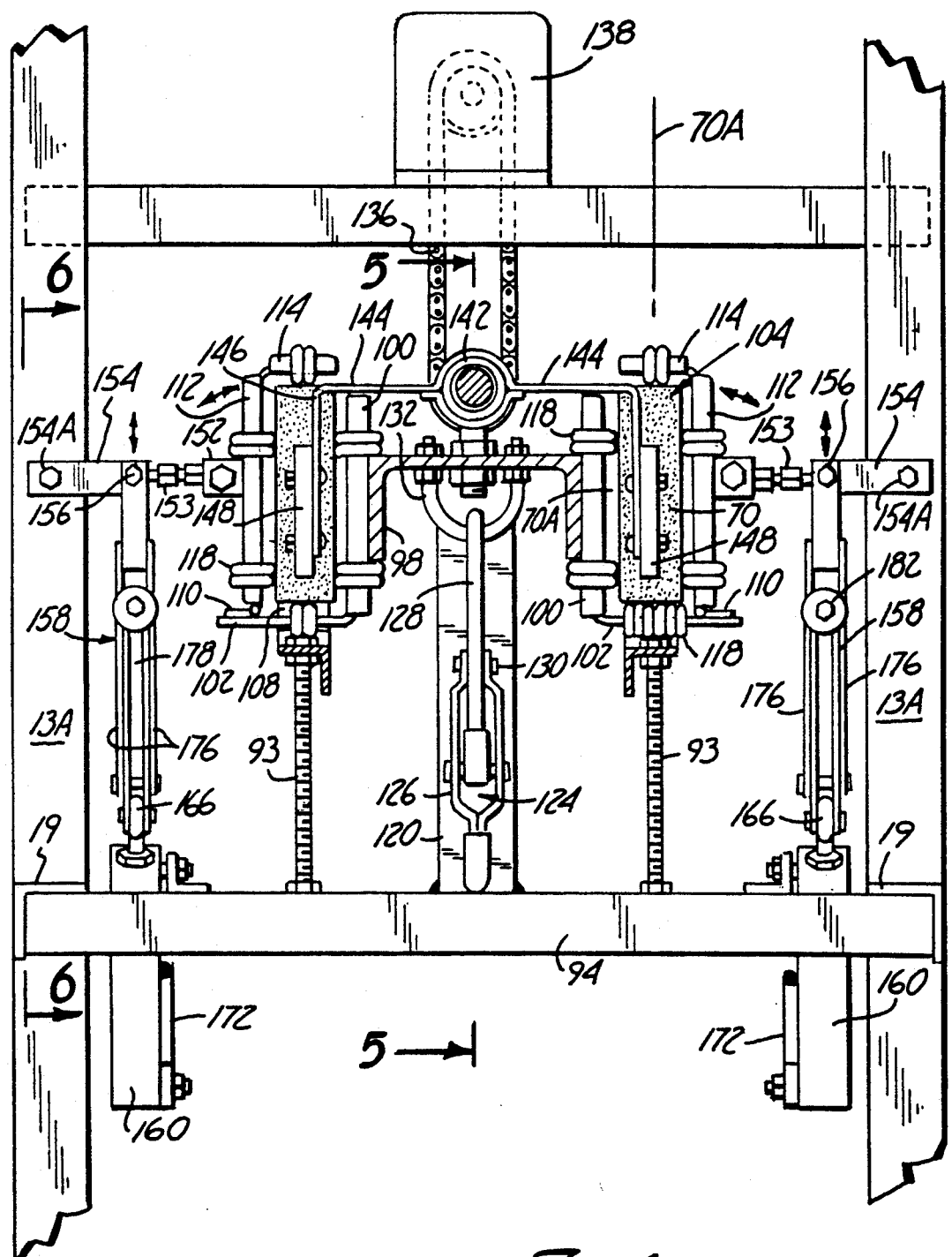
FIG. 4 is a fragmentary sectional view taken as on line 4—4 in FIG. 1.

The chocolate bar feeding assembly 90 has a main U shaped backbone frame 98 as seen in FIG. 4 and in FIG. 5 that extends longitudinally for the length of the feeding assembly. Individual side panels 100 are supported on and carried by the depending legs of the U shaped frame 98. These panels 100 form side members for supporting the respective chocolate bar 70. In addition, the side panels 100 have laterally extending bottom plates 102 mounted thereon, and these bottom plates 102 form the bottom member of each of a pair of individual chocolate bar pockets 104. The bottom members 102 extend laterally from the panels 100. The plates 102 are supported on low friction locating blocks 106 that are supported at the ends of the members 92 adjacent to the cutting knife assembly 54 as shown in FIG. 1. These blocks 106 each have an upright end member 108 that has an end which directly engages the respective chocolate bar 70 and supports the chocolate bar at a point based above the wall 102.

The walls 102 extend laterally outwardly from the U shaped frame 98 and each of the walls 102, adjacent to the outer edge has a hinge member 110 that in turn hingedly mounts a further upright side wall 112 that is the outer wall for supporting the aide of the chocolate bar 70 on the respective side of the chocolate bar pocket. The wall 112 is made with an over hanging lip 114, which overlies the respective chocolate bar 70 and prevents the chocolate bar from being forced upwardly.

The walls 100, 112, and 114 are provided with polyurethane, cylindrically belt like band members 118 which are wrapped around the walls. The bands are continuous members so that they provide contact with the side surfaces 70A of the respectively chocolate bar 70 only at spaced locations. Additionally, the neoprene belts or rings 118 can also be used on the bottoms walls 102 to support the trailing (rear) ends of the chocolate bars spaced above the walls 102, while the forward in feed ends of the chocolate bars are supported on the top of the upright legs 108.

The U shaped frame 98 is held in place on top of an upright square tube 120. The square tube 120 is mounted to a suitable cross member 94, and extends upwardly therefrom. It can be seen in FIG. 5 for example, that the upper end of the tubular member 120 (which is a square cross section) receives a pilot washer or plug 122 that is fixed to the underside an upper wa)1 98A of the U shaped frame 98, and this pilot plug then locates the U shaped member, and the chocolate bar feeding assembly in a proper position for operation.

The chocolate bar feeding assembly is also supported on the cross member 96 at its outward end by having the edges of the downwardly depending legs of the U shaped frame 98 resting on the upper surface of the member 96. There is a pilot pin used to locate the frame 98 relative to member 96. With the pilot plug 122 in position in the tube 120, the feeding assembly 90 is clamped downwardly relative to the tube 120 and member 96 using an over center clamp 124. The over center clamp 124 is a conventional toggle clamp having an actuating lever 126 that has a hook 128 pivotally mounted as at 129 to the lever, and the lever is pivotally mounted as at 130 to suitable ears attached to the upright post 120. A hook portion 128A engages a U bolt 132 that is bolted to the upper wall 98A of the U shaped member 98. By proper adjustment, that is conventional, when the lever 126 goes over center, it will securely and firmly hold the chocolate bar feed assembly 90 against the support member 96 and against the upper edges of the tube 120 with the pilot plug 122 inside the tube for location. This means that the chocolate bar support and feed assembly can be removed merely releasing the lever 126 and the hook portion 128A from the U bolt 132. Then chocolate bar feeding assembly 90 can be removed.

Referring specifically to FIG. 5, it can be seen that the chocolate bars 70 will be moved toward the knife assembly 54 through the use of a chocolate bar drive 130, which is a common drive for simultaneously driving both of the chocolate bars. A screw 131 of suitable size is rotatably mounted on rod end spherically type bearings 132, 132 which are in turn fastened With lock nuts to the upper Wall 98A of the U shaped frame 98. The screw 131 is driven from a sprocket 134 attached at one end, which in turn is driven by a chain 136 from a motor-gear reducer assembly 138 (see FIG. 1). A pusher assembly 140 is driven by this screw. A drive nut 142 drivably mounted onto the screw 131 has a pair of pusher arms 144 fixed thereto. The pusher arms extend laterally. The pusher arms 144 have downwardly depending legs 146 that mount suitable low friction or plastic blocks 148. These blocks 148 are positioned so that they will bear against the rear end surface of the chocolate bar in each of the respective chocolate bar pockets 104. When the screw is threaded while being driven by the motor and drive chain, the blocks 148 will engage the ends of the chocolate bars and tend to slide them toward the knife assembly.

The drive nut 142 used is a nut that is commercially available and permits drive toward the knife assembly, but with quick return. It has a threaded hole so that the nut will drive in direction toward the knife assembly. When there is no load, the nut can be released and retracted quickly for reloading chocolate bars. The threads of the screw 131 are removed in a section 131A, so that the nut will only drive a certain distance in toward the knife assembly before the chocolate bar feed will stop, and new chocolate bars have to be installed.

The screw runs continuously at a low feed rate. The hinged side plates on each of the chocolate bars are released during most of the stroke of the knife assembly 54. Each of the side plates 112 has a bracket 152 thereon, to pivotally mount a links 153. The links 153 are pivoted to second links 154 that form over center lock arrangements. The links 154 are pivotally mounted to frame uprights 13A as at 154A.

Referring to FIG. 6, one pivot 154A, and one link 154 are shown. The junction pivot pin 156 (FIG. 4) between link 153 and 154 is connected to an actuator rod assembly 158. This pivot connection is shown in FIG. 6. The rod assembly 158 acts as a rigid push-pull link, and it is driven by a lever 160 that is pivotally mounted as at 162 to a bracket 164 mounted on the frame of the unit. The lever 160 has a short actuator lever 160A on which a rod end 166 is mounted with suitable lock nuts. The rod end mounts a pivot bolt 168, so that when the rod assembly 158 is in its working position, not its release position, it will exert an upward force on the pivot 156 whenever the lever 160 is moved in direction as indicated by the arrow 170 in FIG. 6. This movement direction also is shown in FIG. 1. Because of the nature of a center pivot link such as 153 and 154, the pivot pin 156 can move downwardly without causing substantial movement of the associated wall 112.

The lever or arm 160 is driven by a link 172 that is pivotally mounted as at 174 to the arm 160. The link 172 in turn is pivotally mounted with a pin 176, to a bracket that attaches to the long connecting rod or connecting link 34. The position of the pivots 174 and 176 are selected so that the amount of movement of the pivot pin 156 is not excessive, but yet when the connecting link 34 moves during most of its stroke, the linkages 154 and 153 will release the pressure on the chocolate bar. This arrangement can be selected as desired. The pivot pin 156 will be raised and then lowered to release the pressure of the respective side plates 112. The pressure is released except during the shaving stroke of the knives. The pivot point 156 does not move a substantial amount because of the short affective lever 160A. The linkage 153, 154 will cycle up and down as the crank 32 turns. The link 172 is made and its pivots adjusted to give the desired timing. Note also, that links 153 are adjustable. The motor 138 is energized to drive the screw slowly and the pusher assembly moves the chocolate bar slowly toward the knives. When the shaving stroke is in progress the chocolate bars are clamped. The pusher arms 144 will resiliently yield as needed when the chocolate bar is changed.

The motor 138 can be timed if desired to go on and off in response to the position of the cutters, and to advance the chocolate bars only during the return stroke of the knives, if desired.

As was stated, the rod assembly 158, is made to be a "breakaway" link that will permit fully relieving the pressure on the side plates for replacing chocolate bars as shown in FIG. 6. Also, when the over all chocolate bar support assembly is to be removed, one of the pins, such as the pin holding the rod end 153 to the brackets 152 can be removed and the link that drives the pivot pin 156 can be released.

The rod assembly 158, as shown, includes a U shaped pair of straps, 176 that have bracket members 177 that mount onto the pivot pin 156, and the U shaped straps 176 in turn pivotally mount a release arm 178. The release arm 178 is mounted on pivot pins 180 near the lower end of the straps 177. The release arm 178 is pivoted with the pin 168 to the rod end 166. The release arm 178 has a latch mechanism 182, so that when it is folded up to be positioned between the straps 176, it is locked in place as is shown in FIG. 4 and is held by there until such time as it is manually released for service, for replacing chocolate bars or the like. When this occurs the position of the linkages 154 and 153 will be moved downwardly to permit the side plate 112 connected to that linkage to fold out of the way on its hinged mounting.

Thus, during the operation as the crank arm 32 rotates, assuming that a chocolate bar is positioned within each of the pockets 104, and the links are all in place for operation, and also that the shaved end of the chocolate bar is in its desired position, the downstroke of the link 34 will cause the plate 26 to be moved downwardly along the guide rods 24 shaving off these curls of chocolate and depositing them into a suitable chute assembly indicated generally at 190.

The upright end or support 108 of the chocolate bar support assembly 106 is chamfered so that the chamfer knives will also clear the end of that support. It should be noted that member 106 and end 108 can be adjusted laterally and longitudinally, so that very precise positioning of the end of the chocolate bar can be obtained. When the crank arm goes beyond the position approximately shown at 32A, the link 76 will be moved to pull the knives away from the chocolate bar, and also the link 182 will pull the lever 160 and release the links 153 and 154 by moving the pin 156 downwardly to relieve the pressure on the side of the chocolate bar. The motor 138 will drive the chain 136 and the screw 131 to provide a pushing force on the chocolate bar to advance the bar the desired distance for one more shaving cut.

Then, as the crank arm comes to the top of its stroke, but not yet over center to the position shown on solid lines in FIG. 1, the knife assembly will be pushed in direction toward the chocolate bar (it will be above the bar at that stage) and the lever 160 will be actuated to lock the side plates 112 into their working position, securely clamping the chocolate bar only during the down stroke or shaving stroke of the knives.

For replacing chocolate bars, the rod assemblies 158 can be released. It should be noted that there are two of the connecting links 172, and that the pin 173 extends laterally of the central connecting link 134 to align with and provide loading on both of the levers 160.

The replacement of the chocolate bar holding unit can be done by releasing the lever 124, and the hook 128A, and lifting the holding unit up. The sprocket 134 is merely removed from the chain 136, and the chain can be left hanging on its drive sprocket on the motor gear reducer 138.

Also, a small pilot pin can be attached to the downwardly depending legs of the U shaped member 98 to fit into a hole on the horizontal portion of the support 96 to provide precise positioning of this assembly when the pilot washer 122 is fitted into the tube 120.

The chocolate temperature is controlled for making uniform cuts, and in one form of the chocolate 85 to 90 degrees is suitable.

Figure 8:
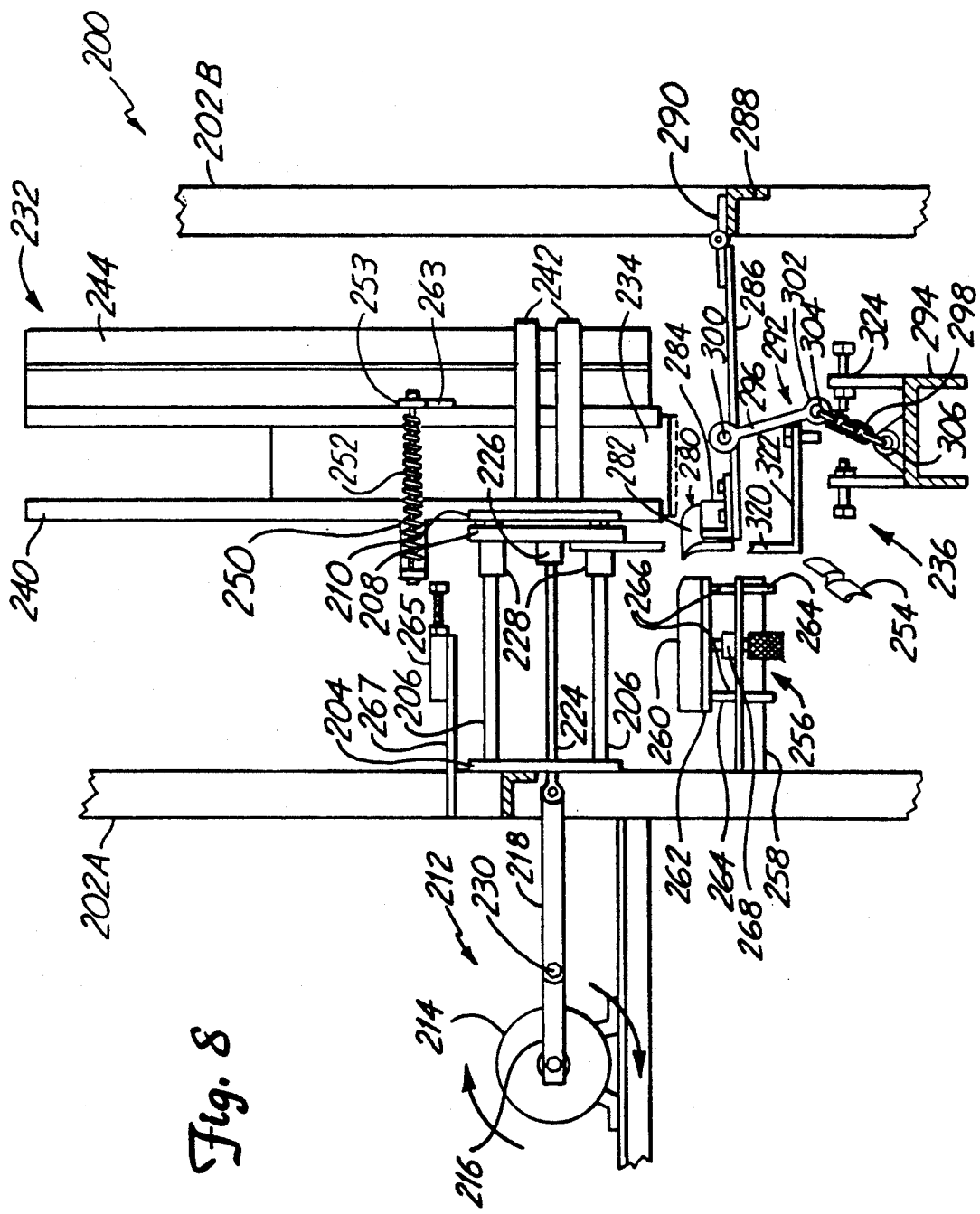
FIG. 8 is a partial side elevational view of a second embodiment of a machine for forming chocolate shaving that spirals made according to the present invention, what parts broken for clarity.
Figure 9:
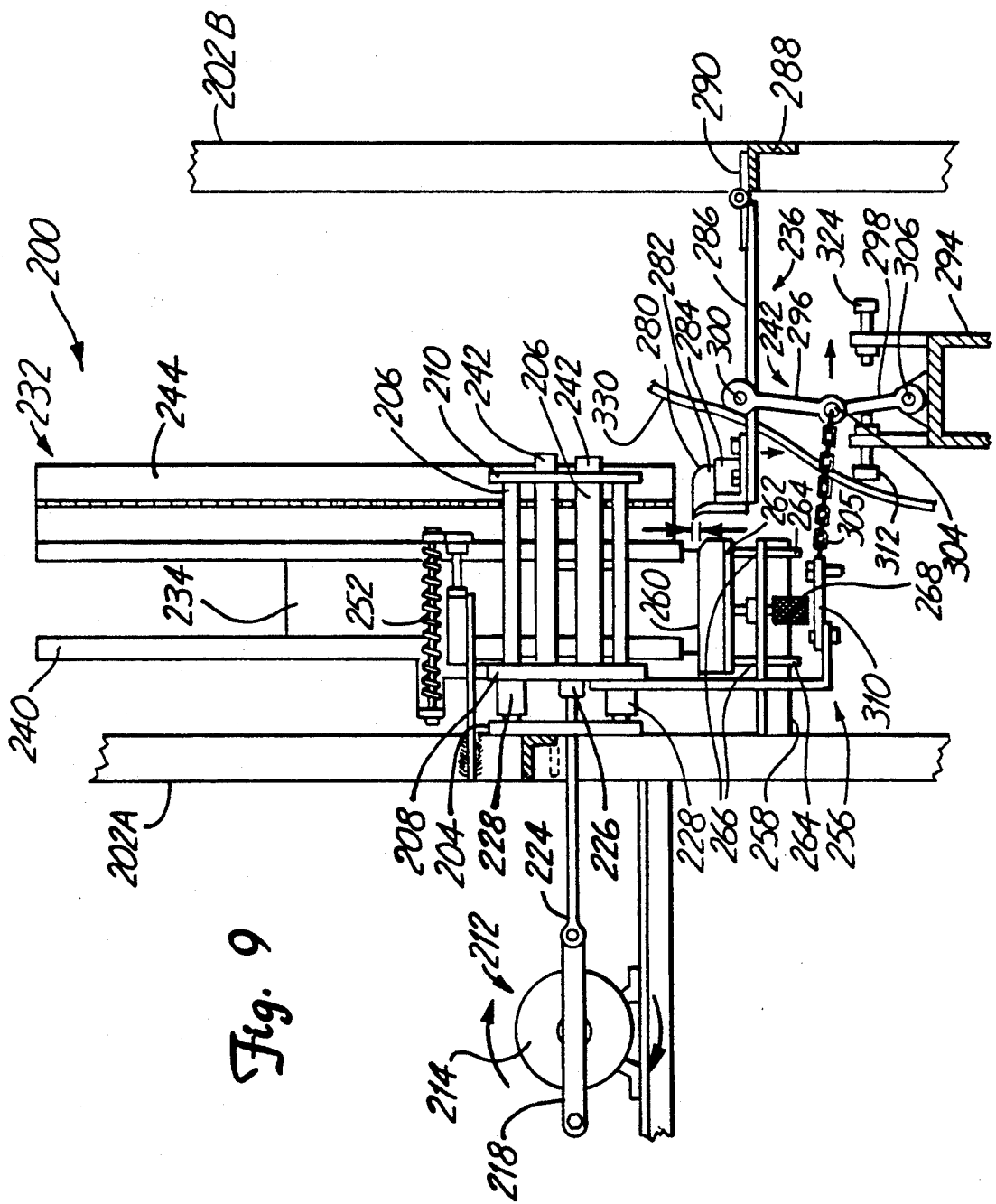
FIG. 9 is a partial side elevational view of the machine shown in FIG. 8 in a second position.
Figure 10:
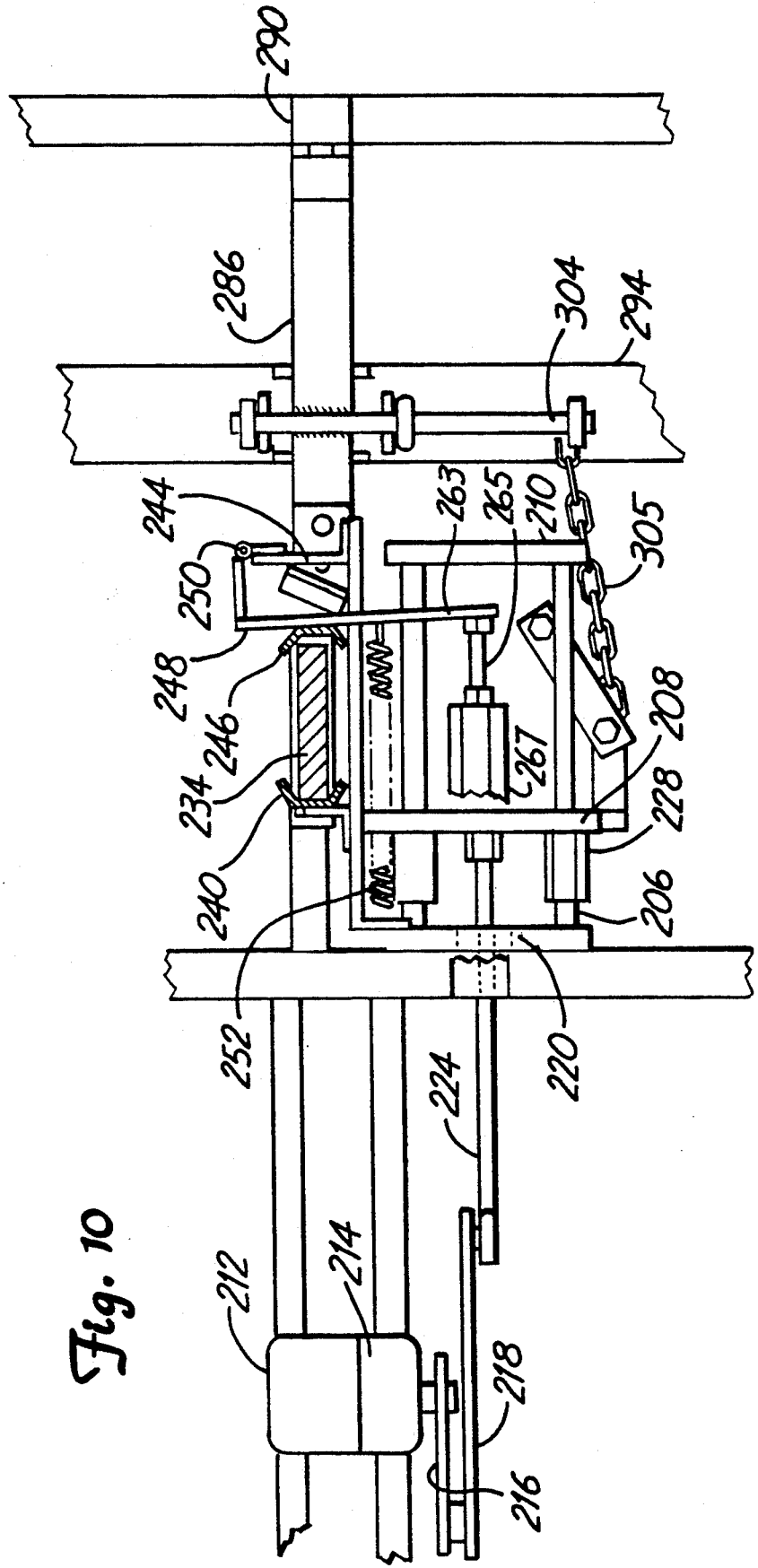
FIG. 10 is a top plan view of the machine shown in FIG. 8, with parts broken away for clarity.

A second embodiment of a machine for shaving spirals from a confectionery bar, such as a chocolate bar is indicated generally at 200 in FIGS. 8-10 and includes a frame assembly having upright frame members 202A and 202B. The upright frame members 202A and 202B are supported on a base frame similar to that shown as 14 in FIG. 1. The upright frame members 202A and 202B are spaced laterally apart when mounted on the base frame and include intermediate cross-members, not shown, to provide additional support.

The upright frame members 202A and 202B support a support plate 204 that has guide rods or columns 206 mounted thereon. The guide rods 206 in turn support a slide plate 208. A cap plate 210 ties the rods 206 together at remote ends from the support plate 204. The main drive for the cutting and shaving action is provided from a motor 212 that drives a gear box 214 which has an output shaft that drives a crank arm 216. The crank arm 216 in turn is attached to a connecting rod or link 218. The connecting rod 218 is attached to a drive rod 224 that extends through a slot 220 (FIG. 10) provided in the support plate 204. The drive rod 224 is connected to the slide plate 208 at a remote end away from the connecting rod 218 with a rod end 226. The rod end 226 has a threaded shank that is locked into position on the slide plate 208 with suitable lock nuts. The slide plate 208 has four hubs or linear bearings 228 thereon that are slidably mounted over the guide rods 206. The motor 212 is powered to turn the crank arm 216 that drives the connecting rod or link 218, which moves the drive rod 224 and the slide plate 208 along the rods 206 through a horizontal stroke length. The link 218 is connected to the crank arm 216 through a suitable drive pin 230.

The slide plate 208 carries an upright confectionery bar feeder system 232 and moves the feeder system longitudinally along a generally horizontal path parallel to the guide rods 206. The confectionery bar feeder system 232 retains a confectionery bar 234, such as a chocolate bar, above a cutting apparatus 236, to be described below.

Unlike the confectionery bar feeder system described above and illustrated in FIGS. 1, 4, and 5, the confectionery bar feeder system 232 in the second preferred embodiment is oriented vertically to take advantage of the weight of the confectionery bar 234. As illustrated, the confectionery bar feeder system 232 includes a generally U-shaped channel 240 that is secured to the slide plate 208. Support beams 242, 242 are also secured to the slide plate 208 and extend generally perpendicularly therefrom. An upright support column 244 is connected to the support beams 242, 242 at there remote ends and extends generally upright substantially parallel to the channel 240. A moveable generally U-shaped upright channel 246 is attached to a support plate 248 that in turn is connected with a hinge 250 to the support column 244. The fixed channel 240 and the moveable channel 246 are spaced apart to accommodate the standard confectionery bar 234, such as a standard chocolate bar. As described above, the standard chocolate bar is 1⅜ inches thick, 10 inches wide and 18 inches long. In the embodiment illustrated, the commercial size bar is split longitudinally to make a bar that is approximately 5 inches wide, 18 inches long, with a standard thickness of 1⅜ inches. The confectionery bar 234 is retained during the cutting stroke by spring tension developed between the U-shaped channels 240 and 246.

A bracket 250 is mounted to the U-shaped channel 240. A spring 252 having a first end connected to the bracket 250 and a second end connected to a bracket 253 mounted to the support plate 248 pulls the U-shaped channel 246 generally toward the U-shaped channel 240, wherein the support plate 248 and the U-shaped channel 246 pivot on the hinge 250. Referring to FIG. 8, the spring tension developed by the spring 252 is sufficient to maintain the confectionery bar 234 vertically in the confectionery bar feeder system 232 against its own weight during the shaving operation to produce a confectionery curl 254.

After the cutting apparatus 236 cuts the confectionery bar 234 to produce the curl or spiral 254, the confectionery bar feeder system 232 is returned to a position as shown in FIG. 9. In this position, the confectionery bar 234 is adjusted for the next cutting stroke with an adjustment system 256. The adjustment system 256 is mounted to a support plate 258 that is attached to the upright support member 202A. The adjustment system 256 includes a support block 260 made from low friction material, such as polytetrafluoroethylene (Teflon). The support block 260 is mounted to a support base 262, which has guide rods 264 extending generally away from support base 262 and through apertures 266 in the support bracket 258. An adjustment mechanism 268, such as a threaded rod having fine or narrowly spaced threads, is connected to the support base 262 and the support plate 258. The support block 260 is adjusted with the adjustment mechanism 268 such that the support block 260 is always positioned below the confectionery bar feeder system 232 as it moves longitudinally along the guide rods 206. By moving the support block 260 vertically through the adjustment mechanism 268, the thickness of the shaved curled or spiral is adjusted during the cutting stroke.

As described above, the spring 252 pulls the moveable U-shaped channel 246 toward the fixed U-shaped channel 240 with sufficient force to retain the confectionery bar 234 therewithin against its own weight. When the confectionery bar feeder system is moved to the position shown in FIG. 9 whereat the confectionery bar 234 is positioned above the support block 260, the moveable U-shaped channel 246 is displaced outwardly from fixed U-shaped channel 240 so that the confectionery bar 234 can fall freely upon the support block 260, thereby adjusting the thickness of the next curl to be cut. The moveable channel 246 is displaced away from the channel 240 by a plate 263 that engages a threaded bolt assembly 265. The threaded bolt assembly is mounted to a support bracket 267 that is secured to the upright member 202A.

Figure 8A:
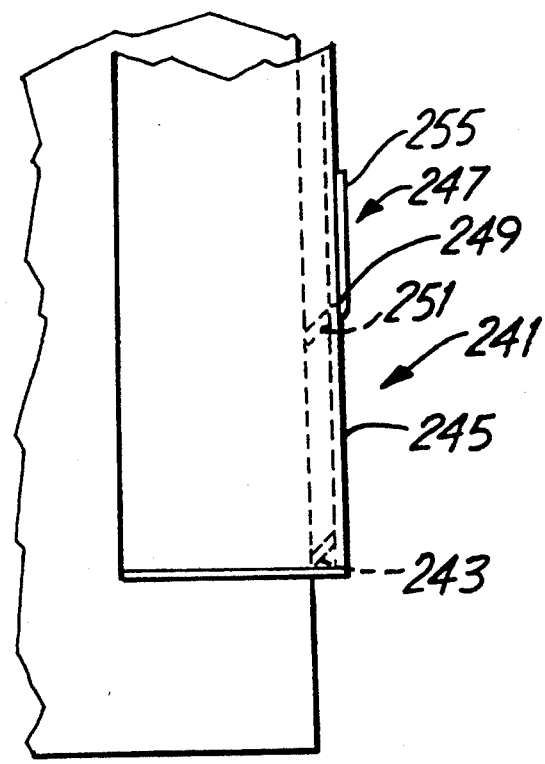
FIG. 8a is a preferred form of the U-shaped channel.

FIG. 8A illustrates a preferred form of the U-shaped channel having confectionery bar gripping means indicated generally at 241. The gripping means 241 help secure the position of the confectionery bar 234 in order to prevent tipping or pivoting while the confectionery bar is being cut. The gripping means include a slightly upturned flange 243 at the lower edge of the center portion 245 of the U-shaped channel. The upturned flange 243 engages the side edge of the confectionery bar to prevent pivoting or upward movement, while still allowing the confectionery bar 234 to move downward for cutting. In the preferred embodiment, a second gripping flange 247 is positioned above the gripping flange 243. The second gripping flange 247 is formed from a single piece of material with a gripping portion 251 extending to engage the confectionery bar 234. The second gripping flange 247 projects through a slot 249 formed in the center portion 245 and has a mounting portion 255 that is secured to the back surface of the channel. Preferably, both of the U-shaped channels 240 and 246 include the above described confectionery bar gripping means.

When the motor 212 rotates the crank arm 216 to begin the cutting stroke in a direction toward the positioned shown in FIG. 8, the spring 252 contracts to develop a retaining force on the confectionery bar 234 with the U-shaped channels 240 and 246. Continued movement of the confectionery bar feeder system 232 to the positioned illustrated in FIG. 8 causes the lower end of the confectionery bar 234 to engage the cutting apparatus 236.

Like the cutting apparatus illustrated in the above described embodiment, the cutting apparatus 236 includes a shaver knife assembly 280 that engages the confectionery bar 234 to produce the shaved spiral or curl 254 during a cutting stroke. After the cutting stroke, the cutting apparatus 236 retracts or pulls the shaver knife assembly 280 away from the confectionery bar 234 in order that the lower end of the confectionery bar 234 does not contact the shaver knife assembly 280 while it is moving back to the support block 260.

Referring to FIG. 8, the shaver knife assembly 280 includes a knife 282 formed in a manner similar to that described above in the embodiment illustrated in FIGS. 1-7. The knife 282 is mounted to a support bracket 284 that in turn is secured to a support plate 286. The support plate 286 connects to a bracket 288 mounted to the upright column 202B with a hinge 290. The hinge 290 allows the support plate 286 and shaver knife assembly 280 mounted thereon to generally move vertically.

Linkage 292 connected between the support plate 286 and a stationary support 294 controls vertical displacement of the shaver knife assembly 280. The linkage 292 includes a first link 296 and a second link 298. The first link 296 is connected to the support plate 286 with a suitable connecting pin 300. At an end 302 opposite connecting pin 300, the first link 296 is joined to the second link 298 with a suitable connecting pin 304. The second link 298 is connected to the support plate 294 at an end opposite the junction between the first link 296 and the second link 298 with a suitable connecting pin 306. Movement of the junction between the first link 296 and the second link 298 to opposite sides of a plane including connecting pin 300 and the connecting pin 306 causes vertical displacement of the shaver knife assembly 280.

Referring to FIG. 9, the shaver knife assembly 280 is lifted and brought into its cutting position by displacing the linkage 292 such that the connecting pin 304 is brought closer to the support block 260 as illustrated in FIG. 9. The positioning mechanism can be a chain 305 or similar device that is connected to the connecting pin 304 and a drive bracket 310 which is mounted to the slide plate 208. Upper movement of the shaver knife assembly 280 is adjusted by a threaded bolt assembly 312 mounted to the support base 294, which engages the second link 298. For example, if the threaded bolt assembly 312 is adjusted to allow the second link 298 to assume a more inclined position, the shaver knife assembly 280 is lowered with respect to the confectionery bar 234. Whereas, if the threaded bolt assembly 312 is adjusted such that the second link 298 is substantially in line with the plane including the connecting pin 300 and the connecting pin 306, the shaver knife assembly 280 is at its maximum height. It is desired however, that the connecting pin 304 be slightly offset from the plane including the connecting pin 300 and the connecting pin 306 such that during the cutting stroke of the shaver knife assembly 280 the linkage 292 is less likely to retract the shaver knife assembly from the confectionery bar 234 to the position shown in FIG. 8.

Once the cutting stroke is complete and the curl 254 is obtained, the shave knife assembly 280 is lowered or retracted so as not to contact the confectionery bar 234 upon its return stroke. In the embodiment illustrated, a drive bracket 320 is connected to the slide plate 208 and has a portion 322 which will contact the first link 296 when the cutting of the confectionery bar 234 is complete. The drive bracket 320 drives the linkage 292 such that the connecting pin 304 is moved from its position shown in FIG. 9 to a position shown FIG. 8 that is on an opposite side of the plane including the connecting pin 300 and the connecting pin 306.

A second threaded bolt assembly 324 on a side opposite the threaded bolt assembly 312 and attached to the support base 294 engages the second link 298 to prevent further movement of the linkage 292. With adjustment of the threaded bolt assembly 324, the lower position of the retracted shaver knife assembly 280 is obtained.

A shield 330 is mounted proximate to the cutting apparatus 236 in order to direct shaved confectionery spirals or curls away from the cutting apparatus 236 and to a desired collection location.

Although the shaver knife assembly 280 has been illustrated with a single cutting knife 282, it is to be understood that a plurality of cutting knives can be mounted to the support plate 286 in a manner described above so as to cut the confectionery bar 234 along beveled or chamfered surfaces on the edge of the confectionery bar 234 as well as its end surface. Each knife is constructed in the same manner as described above in order to obtain the desired spiral or curl.

Figure 11:
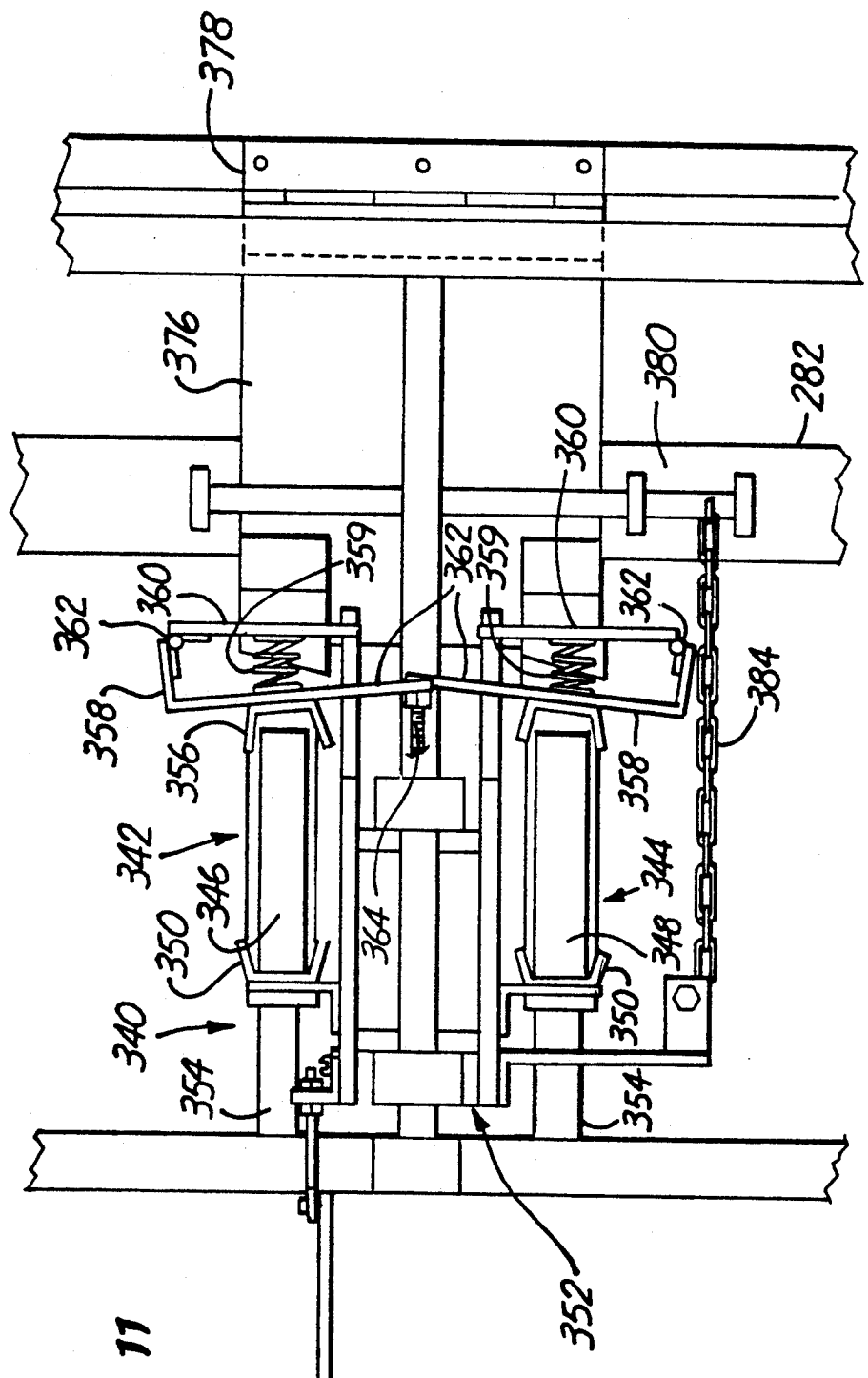
FIG. 11 is a machine of a third embodiment for forming chocolate shaving spirals made according to the present invention, with parts broken away for clarity.
Figure 12:
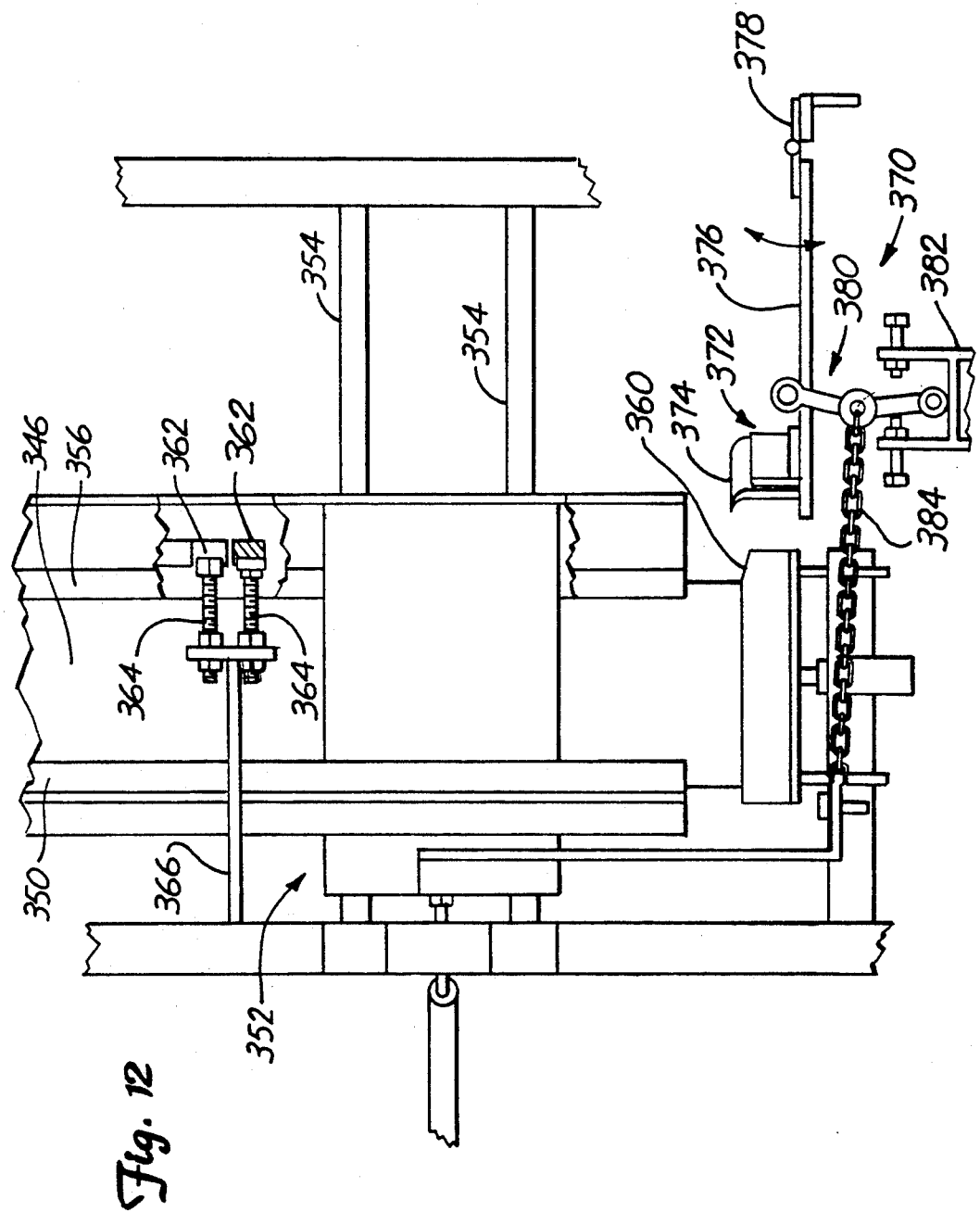
FIG. 12 is a partial side elevational view of the machine shown in FIG. 11.

FIGS. 11 and 12 illustrate a third preferred embodiment of the present invention. Like the embodiment illustrated in FIGS. 8 through 10, the third preferred embodiment includes a confectionery bar feeder system 340. The confectionery bar feeder system 340 is similar to the feeder bar system 232 described in the previous embodiment; however, the present feeder bar system 340 includes two feeder stations 342 and 344 that retain confectionery bars 346 and 348, respectively. Each feeder bar station 342 and 344 includes a fixed generally U-shaped channel 350 mounted to a slide assembly 352 that is guided on rods 354 in a manner as previously taught.

Opposed to each fixed U-shaped channel 350 is a movable generally U-shaped channel 356. The moveable U-shaped channel 356 is mounted to a support plate 358 that in turn is hinged to a fixed plate 360 with a hinge 362. A spring 359 located between the support plate 358 and the fixed plate 360 applies pressure to each corresponding confectionery bar to retain it within the feeder station.

The confectionery bar feeder system 340 is moved longitudinally along the guide rods 354 to positions above corresponding support blocks 360, one of which is shown in FIG. 12, that are used to set the cutting thickness, in a manner as previously described, for each cutting stroke. When the confectionery bar feeder system 340 is substantially positioned above each corresponding support block 360, the springs 359 are compressed by a bracket 362 attached to the U-shaped movable channels, thereby releasing the confectionery bars and allowing each confectionery bar to be supported by the corresponding support block. Threaded bolt assemblies 364 mounted to a support plate 366 adjust displacement of the moveable channels 356. Upon movement of the confectionery bar feeder system 340 away from the support blocks 360 and toward knives of a cutting apparatus 370, the movable channels 356 clamp upon the confectionery bars to retain their position against their own weight.

The cutting apparatus 370 is similar to the cutting apparatus 236 described in the previous embodiment. The cutting apparatus 370 includes a shaver knife assembly 372, one of which is shown in FIG. 12, for each cutting station. At least one knife 374 is used in each shaver knife assembly and is mounted to a common support plate 376 that in turn is hinged with a hinge 378 to the upright support column. A linkage 380, similar to the linkage 292 of the previous embodiment, is connected between the support plate 376 and a support base 382 moves the support plate 376 and the shaver knife assemblies 372 vertically to a position in order to cut the confectionery bars, while retracting them to lower positions in order that the knifes do not contact the confectionery bars during their return stroke to the support blocks. As with the cutting apparatus described above, a chain 384 is used to position the linkage 380 and, thus, the shaver knife assemblies 372 in a cutting position before the cutting stroke is initiated, while a drive bracket, similar to bracket 320 of the previous embodiment, engages the linkage 380 to lower the support plate 376 and the shaver knife assemblies 372 to the retracted position.

Although the present invention has been described with reference to preferred embodiments, workers skilled in the art will recognize that changes may be made in form and detail without departing from the spirit and scope of the invention.

What is claimed is:

1. A cutter apparatus for shaving ends off a confectionery bar comprising:
   a support for holding a confectionery bar, said confectionery bar having a surface that extends in a reference direction of a desired length and having a lateral thickness perpendicular to such direction;

a shaver knife assembly slidably mounted relative to said confectionery bar and moveable in said reference direction in a cutting stroke while in engagement with the confectionery bar, said shaver knife assembly including at least one knife that has an edge cutting along the confectionery bar and oriented to form a curl from the shaving as the knife moves along the confectionery bar, said knife having a curved back position for guiding the curl;

means for retracting the shaver knife assembly in a direction away from the confectionery bar and returning the shaver knife assembly to an original starting position for a new cutting stroke; and means for advancing the confectionery bar to a cutting position after each cutting stroke.

2. The apparatus as specified in claim 1 wherein said shaver knife assembly has three knives, each of the knives cutting an exposed portion of the confectionery bar to be shaved.

3. The apparatus as specified in claim 1 and means for holding the confectionery bar in position securely when the cutting knife assembly shaves material off from the surface of the confectionery bar, and release means for releasing the means for holding while the shaver knife assembly is not in its cutting stroke.

4. The apparatus as specified in claim 3 wherein the means for relieving the holding pressure, and the means for retracting the shaver knife assembly away from the confectionery bar and for returning the shaver knife assembly back toward its starting position are mechanically connected and driven from a common drive.

5. The apparatus as specified in claim 4 wherein the means for moving the confectionery bar toward the shaver knife assembly comprises a pusher assembly, the pusher assembly having a drive screw, and means for driving the drive screw.

6. The apparatus of claim 5 and a frame mounting the means for moving the confectionery bar and the means for holding the confectionery bar as a unit, said frame being removably mounted relative to the cutter knife assembly.

7. The apparatus of claim 3 wherein the means for holding the confectionery bar comprises a pair of side walls, one of the side walls being hinged, and the release means comprising a linkage for hinging the one side wall away from the confectionery bar.

8. A cutter apparatus for shaving ends off a confectionery bar, comprising:
a frame;
a support mounted on the frame for holding a confectionery bar, said confectionery bar having a surface of a desired length that extends in a reference direction and having a lateral thickness perpendicular to such direction;
a shaver knife assembly slidably mounted on the frame relative to said confectionery bar and moveable in said reference direction in a cutting stroke while in engagement with the confectionery bar, said shaver knife assembly including at least one said knife formed and oriented for guiding a shaving made in the cutting stroke into a curled shape;
means for driving the shaver knife assembly in a reciprocal path; and
means for advancing the confectionery bar toward the knife as the knife reciprocates.

9. The apparatus as specified in claim 8 and means for holding the confectionery bar in position securely when the cutting knife assembly shaves material off from the surface of the confectionery bar, and release means for releasing the means for holding while the shaver knife assembly is not in its cutting stroke.

10. The apparatus as specified in claim 9 wherein the means for driving includes means for retracting the shaver knife assembly away from the confectionery bar at the end of the cutting stroke and for returning the shaver knife assembly back toward a starting position with the shaver knife assembly retracted.

11. The apparatus as specified in claim 10 wherein the means for advancing the confectionery bar toward the knife comprises a pusher assembly, the pusher assembly having a drive screw, and means for driving the drive screw.

12. A machine for shaving ends off a confectionery bar comprising:
a first frame support for holding a reciprocating shaver knife assembly slidably mounted relative to first frame and moveable in a reference direction in a cutting stroke;
a unitary subframe mounted on said first frame;
means on said subframe for mounting a confectionery bar adjacent to the shaver knife assembly;
means on the subframe for advancing the confectionery bar to a cutting position after each cutting stroke;
means for mounting the subframe to the first frame comprising a hollow tube on the first frame, said hollow tube having an end surface, said subframe having a subframe surface resting on the end of the tube;
a pilot location on the subframe for fitting inside the tube; and
a releasable clamp for clamping the subframe surface to the end surface of the tube for supporting the subframe in position.

13. The machine of claim 12 and a second support member on the first frame supporting the subframe at a location spaced from the pilot location.

14. A cutter apparatus for shaving ends off a confectionery bar comprising:
a support for holding a confectionery bar, said confectionery bar having a surface that extends in a reference direction a desired length and having a lateral thickness perpendicular to such direction;
a stationary frame;
a shaver knife assembly mounted to the frame for cutting said confectionery bar along said reference direction in a cutting stroke while in engagement with the confectionery bar, said shaver knife assembly including a knife that has an edge cutting along the confectionery bar and oriented to form a curl from the shaving as the knife cuts the confectionery bar; and
means for causing relative movement between the confectionery bar and the shaving knife assembly such that the knife cuts the confectionery bar.

15. The apparatus as specified in claim 14 wherein said knife includes a curved back for guiding the curl.

16. The apparatus as specified in claim 14 and further comprising means mounted to the frame for selectively positioning the shaver knife assembly in a cutting position to cut the confectionery bar, said means moving the shaver knife assembly in a direction away from the confectionery bar to a retracted position after cutting the confectionery bar and returning the shaver knife assembly to the cutting position for a new cutting stroke.

17. The apparatus as specified in claim 16 wherein the shaver knife assembly moves between the cutting position and the retracted position along a direction substantially perpendicular to the reference direction.

18. The apparatus as specified in claim 17 wherein the shaver knife assembly includes a hinge connecting the shaver knife assembly to the stationary frame.

19. The apparatus as specified in claim 14 wherein the shaver knife assembly includes a plurality of knives, each knife forming a curl from the shaving as the knife cuts the confectionery bar.

20. The apparatus as specified in claim 14 wherein the knife cuts the confectionery bar along a first end surface, and wherein the shaver knife assembly includes a second knife for cutting the confectionery bar along a second end surface, the second end surface forming a chamfer surface with respect to the first end surface.

21. The apparatus as specified in claim 14 wherein the support for holding the confectionery bar includes means for advancing the confectionery bar to position the confectionery bar for cutting.

22. The apparatus as specified in claim 14 wherein the confectionery bar is held substantially stationary with respect to the frame during the cutting of the confectionery bar and the shaver knife assembly is moved relative to the confectionery bar during the cutting of the confectionery bar.

23. The apparatus as specified in claim 14 wherein the shaver knife assembly is held substantially stationary with respect to the frame during the cutting of the confectionery bar and the confectionery bar is moved relative to the shaver knife assembly during the cutting of the confectionery bar.

24. The apparatus as specified in claim 14 wherein the support for holding the confectionery bar includes means for holding a second confectionery bar; and the shaver knife assembly includes means for cutting the second confectionery bar to form a second curl from the shaving; and wherein the means for causing relative movement displaces the second confectionery bar relative to the shaver knife assembly such that the means for cutting cuts the second confectionery bar.

* * * * *